(12) United States Patent
Alho et al.

(10) Patent No.: US 11,060,432 B2
(45) Date of Patent: Jul. 13, 2021

(54) METHOD FOR CONTROLLING REDUCTANT INJECTION FOR AN EMISSION REDUCTION SYSTEM OF AN INTERNAL COMBUSTION ENGINE

(71) Applicant: WÄRTSILÄ FINLAND OY, Vaasa (FI)

(72) Inventors: Timo Alho, Vaasa (FI); Markus Lövholm, Vaasa (FI); Andreas Holmqvist, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 435 days.

(21) Appl. No.: 16/185,566

(22) Filed: Nov. 9, 2018

(65) Prior Publication Data
US 2019/0072016 A1    Mar. 7, 2019

Related U.S. Application Data

(63) Continuation of application No. PCT/FI2016/050321, filed on May 13, 2016.

(51) Int. Cl.
| F01N 3/00 | (2006.01) |
| B01D 53/00 | (2006.01) |
| F01N 3/20 | (2006.01) |
| F01N 9/00 | (2006.01) |
| B01D 53/94 | (2006.01) |
| F01N 3/10 | (2006.01) |

(52) U.S. Cl.
CPC ......... *F01N 3/208* (2013.01); *B01D 53/9431* (2013.01); *B01D 53/9495* (2013.01); *F01N 9/00* (2013.01); *F01N 3/10* (2013.01); *F01N 3/2066* (2013.01); *F01N 2390/02* (2013.01); *F01N 2610/02* (2013.01); *F01N 2610/146* (2013.01); *F01N 2900/0408* (2013.01); *F01N 2900/1402* (2013.01); *F01N 2900/1812* (2013.01); *Y02T 10/12* (2013.01); *Y02T 10/40* (2013.01)

(58) Field of Classification Search
CPC ............... F01N 3/208; F01N 2610/146; B01D 53/9431; B01D 53/9495
See application file for complete search history.

(56) References Cited

U.S. PATENT DOCUMENTS

| 2013/0098003 A1 | 4/2013 | Pietraszek |
| 2014/0360168 A1 | 12/2014 | Broderick et al. |

FOREIGN PATENT DOCUMENTS

| DE | 102008060373 A1 | 6/2010 |
| EP | 2366448 A1 | 9/2011 |

OTHER PUBLICATIONS

International Search Report (PCT/ISA/210) dated Feb. 1, 2017, by the Finnish Patent Office as the International Searching Authority for International Application No. PCT/FI2016/050321.
Written Opinion (PCT/ISA/237) dated Feb. 1, 2017, by the Finnish Patent Office as the International Searching Authority for International Application No. PCT/FI2016/050321.

*Primary Examiner* — Christopher Adam Hixson
(74) *Attorney, Agent, or Firm* — Buchanan Ingersoll & Rooney PC

(57) ABSTRACT

When an internal combustion engine is driven at a low rate below a certain threshold value, exemplary embodiments as disclosed herein allow and restrict a reductant flow to an injector in repeating allowing cycles and restricting cycles. During the allowing cycles the controller is set to keep the reductant flow as close as possible a determined low point setpoint value. During the restricted cycles the reductant flow is prevented.

14 Claims, 2 Drawing Sheets

METHOD FOR CONTROLLING REDUCTANT INJECTION FOR AN EMISSION REDUCTION SYSTEM OF AN INTERNAL COMBUSTION ENGINE

RELATED APPLICATION

This application claims priority as a continuation application under 35 U.S.C. § 120 to PCT/FI2016/050321 filed as an International Application on May 13, 2016 designating the U.S., the entire content of which is hereby incorporated by reference in its entirety.

FIELD

The present disclosure relates to a control arrangement and a method used in the arrangement for controlling reductant injection for an emission reduction system of an internal combustion engine.

BACKGROUND INFORMATION

Nowadays emission requirements are very tight for internal combustion engines, for example for gas engines or for diesel engines. A specified NOx level can be very low.

It is known to use an emission reduction system, for example a SCR system (Selective Catalytic Reduction). The SCR system converts nitrogen oxides (NOx) with the aid of a catalyst into nitrogen (N2) and water (H2O). A reductant, such as ammonia or urea, is added to a stream of exhaust gas and is adsorbed onto a catalyst.

In order to run properly the emission reduction system involves a control arrangement for achieving the required NOx level. An amount of the reductant, which is added in the exhaust gas, should be as close as possible the amount needed. A feedback control system has been found to offer good results. The feedback control system follows a setup value for the reductant, which means that the addition of reductant into the exhaust gas is kept as close as possible the setup value. The setup value in turn depends on how the engine is run. For example, when the internal combustion engine runs at high load rate, the required amount of the reductant is higher than if the engine runs at lower load rate.

An exemplary feedback control system has a feedback line from a flow meter to a controller. The flow meter measures a reductant flow from a reductant source to an injector that injects the reductant into the exhaust gas. The mix of the exhaust gas and the reductant flows into the emission reduction system. The controller controls a valve of the injector in order keep the reductant flow as close as possible the setup value of the reductant flow. Usual control concepts used by the controller are PI or PID.

The feedback control system provides very good control properties when the internal combustion engine runs at high rates or middle rates. But if the engine runs at low rate when the required flow of the reductant is also low, the accuracy of the flow meter is not good. So then, the feedback from the flow sensor is also not accurate, which means the control is not accurate as well. Therefore the NOx levels may rise above the required level and reductant slip may occur. The reductant slip means that a part of the reductant passes through the SCR unreacted.

SUMMARY

A method is disclosed for controlling reductant injection for an emission reduction system of an internal combustion engine, the method comprising: measuring reductant flow to an injector with a flow meter; controlling at least one valve to adjust reductant flow based on measured reductant flow and a setpoint value; and when the setpoint value is below a predetermined threshold value (L1): determining a low mode setpoint value (LS) as said predetermined threshold value (L1) or as a threshold value (L2) higher than (L1); and allowing and restricting reductant flow to the injector in repeating alternate allowing cycles (D1) and restricting cycles (D2) in such a way that during the allowing cycles (D1) the low mode setpoint value (LS) is used as said setpoint when controlling at least one valve, and during the restricting cycles (D2) the reductant flow is prevented.

DETAILED DESCRIPTION OF THE DRAWINGS

In the following, exemplary embodiments will be described in more detail by reference to the enclosed drawings, wherein.

DETAILED DESCRIPTION

As disclosed herein, when an internal combustion engine is driven at a low rate below a certain threshold value, the reductant flow to the injector is allowed and restricted in repeating "allowing" cycles and "restricting" cycles. During the allowing cycles the controller is set to keep the reductant flow as close as possible a determined low point setpoint value. During the restricted cycles the reductant flow is prevented.

It is convenient that the threshold value can be set at a level where the flow meter works properly. Therefore the accuracy of the control remains at good level due to the properly working feedback system when the internal combustion engine runs at high or medium load rate, i.e. on or above the threshold. When the engine runs at low rate, i.e. the setup value for the reductant flow is below the threshold level, inaccuracy of the flow sensor does not affect the control, and the quality of the control can be kept at good level due to the repeating allowing cycles and restricting cycles.

Figure 1:
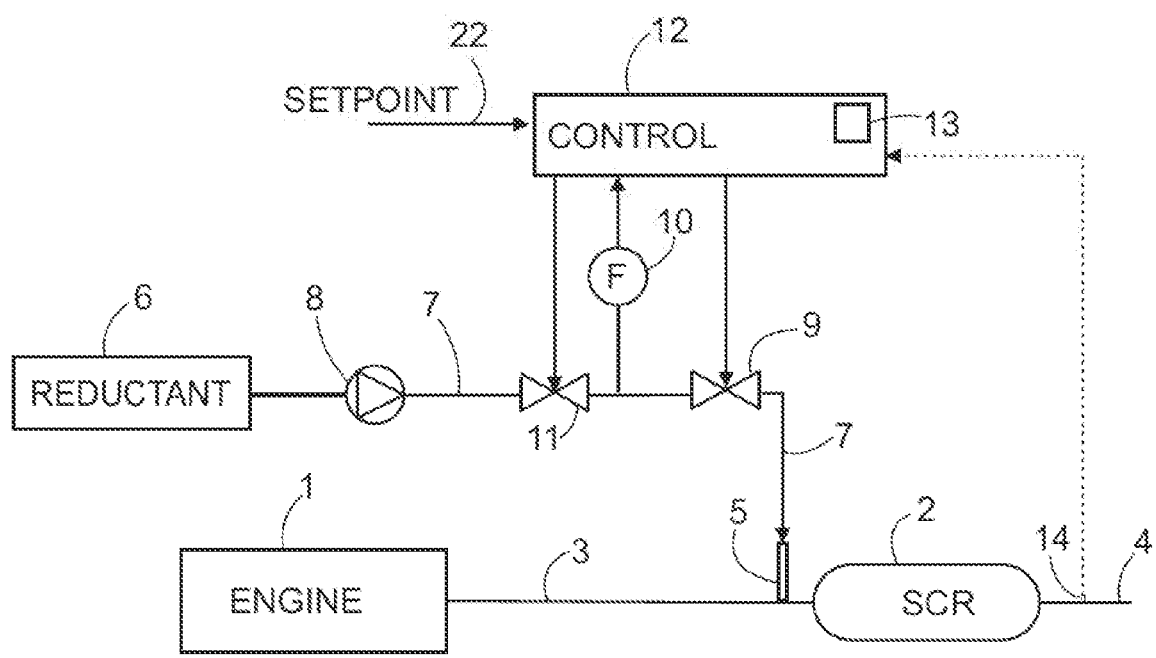
FIG. 1 illustrates an example of a control arrangement according to the present disclosure.

FIG. 1 illustrates an example of a control arrangement according to the present disclosure. An engine 1 produces exhaust gas when running. The exhaust gas is directed out to the air through a front exhaust pipe 3, an SCR system 2 and a rear exhaust pipe 4. The SCR system purifies the exhaust gas from impurities, like NOx, before directing the exhaust gas out.

The desired reductant, and/or the reductant needed by the SCR system, is injected into the front exhaust pipe 3 through an injector 5. The SCR system 2 receives the mixture of the exhaust gas and the reductant. The reductant, like ammonia or urea, is transmitted to an injector 5 from a reductant source 6 through a pipeline 7. The reductant source 6 can be a tank containing the reductant, and the pipeline can be provided with a pump 8 in order to direct the flow of the reductant towards the injector 5. In addition the pipeline 7 is also provided with at least one valve 9. The valve 9 is for example a proportional valve. There can also be another valve 11 in the exemplary embodiment of FIG. 1, but it can be taken away for implementation reasons.

The control arrangement can have a controller 12 that controls the valve 9 in order to keep the flow of the reductant to the injector 5 at a desired value. The desired value is given to the controller 12 as a setpoint value. The setpoint value relates to the load rate of the running engine, which can be measured from the output axis of the engine, for example from the speed measurement. The setpoint value may also relate to a measurement 14 of NOx in the exhaust gas. In addition, other parameters of the engine may also affect to the setpoint value. The controller can include a memory 13 in order to keep control parameters and other information needed.

The control arrangement can be also provided with a reductant flow meter 10 in order to measure the reductant flow in the pipeline 7. The reductant flow sensor provides a feedback of the reductant flow data to the controller 12.

Figure 2:
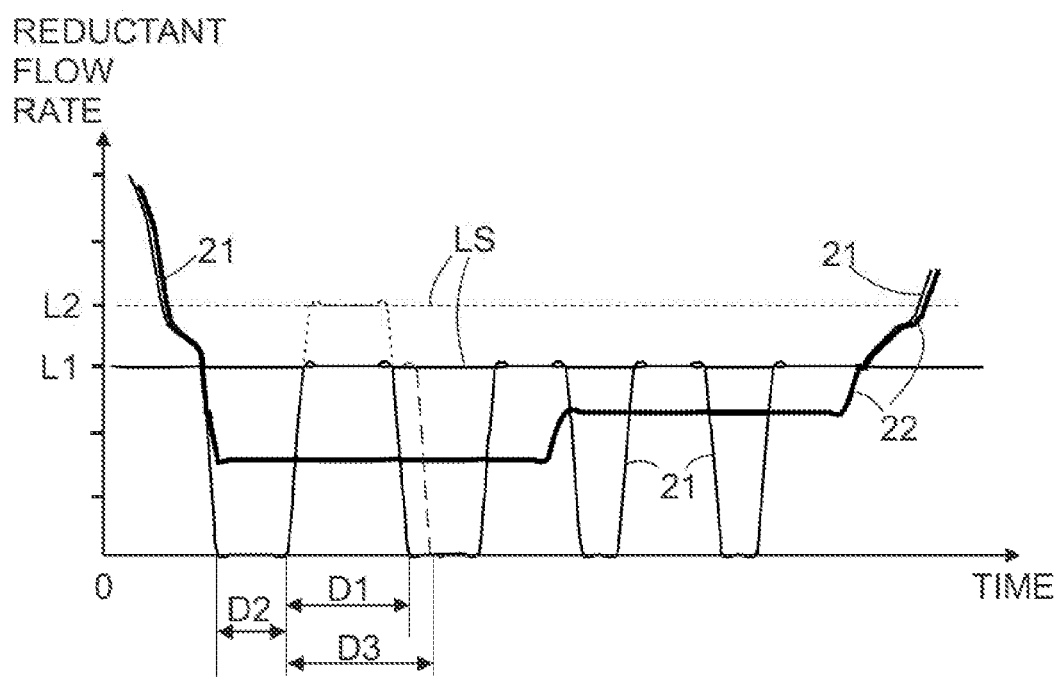
FIG. 2 illustrates an example of reductant flow rate levels used in an exemplary embodiment.
Figure 3:
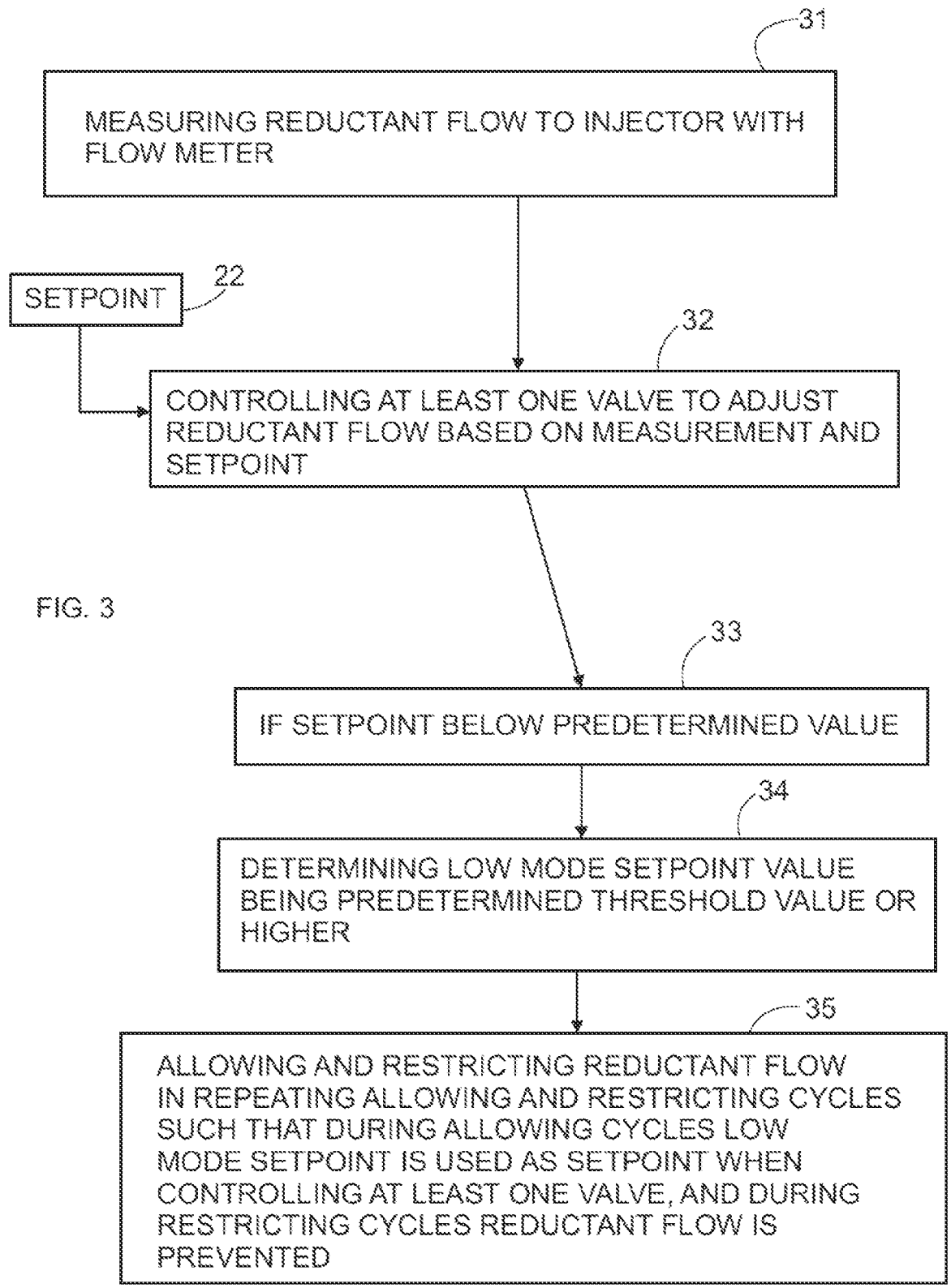
FIG. 3 illustrates a flow chart example of a method according to the present invention.

The flow chart of FIG. 3, an example of reductant flow rate levels shown in FIG. 2, and FIG. 1 will be utilized for describing an exemplary method used in the control arrangement. The method for controlling reductant injection for an emission reduction system 2 of an internal combustion engine 1 can include measuring 31 reductant flow to an injector 5 with a flow meter 10, and controlling 32 at least one valve 9 to adjust reductant flow based on the measured reductant flow and a setpoint value 22. These steps provide a feedback control, which can utilize a PI or PID control logic. When the engine runs at high or medium rate, the feedback control gives good results.

In case 33, the setpoint value 22 is below a predetermined threshold value L1, for example below an accuracy level of the flow meter 10 wherein it still works accurately. When not below that level, the method can have steps of determining 34 a low mode setpoint value LS as the predetermined threshold value L1 or a higher L2 threshold value; and allowing and restricting 35 reductant flow to the injector 5 in repeating allowing cycles D1 and restricting cycles D2. The allowing and restricting step 35 is utilized in such a way that during the allowing cycles D1 the low mode setpoint value LS is used as the setpoint when controlling the valve, and during the restricting cycles D2 the reductant flow is prevented. The allowing cycles D1 and the restricting cycles D2 alternate.

The alternating allowing cycles and restricting cycles are shown in FIG. 2. In order to achieve the reductant flow average to be the setpoint value 22, the duration of the allowing cycles D1 and the restricting cycles D2 are adjusted. For example, if the low mode setpoint value LS is equal to the predetermined threshold value L1, and the setpoint value 22 is half of L1, the duration of the allowing cycle D1 is equal with the restricting cycle D2. It is noted that the setpoint value 22 from outside the controller 12 is also received and utilized by the controller 12 during the allowing and repeating cycles, but the low mode setpoint value LS is used as the setpoint when controlling the valve 9 during the allowing cycles.

In FIG. 2 the time axis can indicate time in seconds for example, and the reductant flow rate can be ml/s or a percentage value of the maximum rate, for example. So maximum rate is 100% when the percentage value is used. The setpoint 22 received by the controller 12 can be a reagent flow rate as such or another value that corresponds the reagent flow rate needed.

The low mode setpoint value LS can be the predetermined threshold value L1 or a threshold value L2 higher than L1. In FIG. 2 an example of the higher setpoint value L2 is shown as a dashed line, in which case the setpoint level for the valve 9 and the reductant flow rate to be achieved during the allowing cycles D1 is higher. The higher allowing cycle is also shown as a dashed line. It is also possible to adjust the duration of the allowing cycle, which is indicated as a wider cycle D3. So, the allowing cycles can be formed in many ways, and their height and width are taken into account in order to achieve the reductant flow as average to be the setpoint value 22. Areas to the allowing cycles and the restricting cycles are taken into account in order to get the average value, i.e. the setpoint value 22.

The duration of the allowing and restricting cycles can be determined by the physical system. A minimum pulse time that is useable by the arrangement is determined. The total duration of the allowing and restricting cycles are determined to be clearly smaller than a time constant of the controlled system.

Since the setpoint value 22 changes due to changes of how to drive the engine 1, the duration of the allowing cycles and the restricting cycles are changed also in order to achieve the changed setup value 22 as shown in FIG. 2. The setup value 22 is marked as a thick line and the actual reductant flow rate is marked as a thin line 21. Above the predetermined threshold value L1 the reductant flow rate 21 follows the setup value 22, but when the setup value is below the predetermined threshold value L1 the reductant flow rate 21 follows the allowing cycles and the restricting cycles, i.e. the low mode setpoint value during the allowing cycles and zero level during the restricting cycles. During the allowing cycles D1 the valve 9 is controlled according to PI or PID control logic utilizing the low mode setpoint value LS.

Further, during the allowing cycles D1 the reductant flow can be measured with the flow meter 10. An average flow can also be measured in order to utilize the measured average flow for achieving the reductant flow according to the setpoint value 22 as average.

The valve 9 to be controlled can be a proportional valve. At the beginning of the restricting cycles D2 a controlling value for the proportional valve is stored to a memory 13, and after that the controlling value for the proportional valve 9 is changed to a zero reductant flow, and the controlling value is freezed (i.e., held) to the zero reductant flow until the end of the restricting cycles D2. The controlling value is restored from the memory 13 at the end of the restricting cycles D2. These steps can be made as the control arrangement utilizes one valve.

If the control arrangement has other valves too, for example the valves to be controlled are a proportional valve 9 and an on-off valve 11, the steps to be performed in an exemplary embodiment, can include freezing (i.e., holding) the controlling value for the proportional valve 9 at the beginning of the restricting cycles D2 until the end of the restricting cycles D2, and closing the on-off valve 11, and also opening the on-off valve 11 at the end of the restricting cycles D2.

In addition the method can include measuring 14 emission of the internal combustion engine 1 and in case of the measured emission is above an allowed level, freezing the setpoint value 22, and adjusting the duration of the allowing cycles D1 and the restricting cycles D2, and/or changing the low mode setpoint value LS until the measured emission is at the allowed level or lower.

It is convenient that the predetermined threshold value L1 corresponds with a minimum accuracy limit of the flow meter 10. In this way the inaccurate working area of the flow meter does not affect to the quality of the control of the reductant injection. Instead the allowing and restricting cycles are used in the inaccurate working area, which occurs at low load range of the engine. The alternating allowing and restricting cycles provide a good control, which can satisfy the requirements for the emissions, like NOx level. It is also convenient to utilize the allowing and restricting cycles if other flow control imperfections occur. In other words, when running the alternating cycles control quality can be provided which is good enough, but which may not be as good as the quality of the feedback system.

Exemplary embodiments can be used for an emission reduction system, like the SCR system, in order to decrease emission of the internal combustion engine. Very good results are achieved with gas engines where operation windows are large, and due to large variance in NOx emissions at different loads. It will be evident from the above to those skilled in the art that the invention is not limited to the embodiments described in this text but can be implemented in many other different embodiments within the scope of the independent claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for controlling reductant injection for an emission reduction system of an internal combustion engine, the method comprising:
   measuring reductant flow to an injector with a flow meter;
   controlling at least one valve to adjust reductant flow based on the measured reductant flow and a setpoint value; and
   when the setpoint value is below a predetermined threshold value (L1):
   determining a low mode setpoint value (LS) as said predetermined threshold value (L1) or as a threshold value (L2) higher than (L1); and
   allowing and restricting reductant flow to the injector in repeating alternate allowing cycles (D1) and restricting cycles (D2) in such a way that during the allowing cycles (D1) the low mode setpoint value (LS) is used as said setpoint when controlling at least one valve, and during the restricting cycles (D2) the reductant flow is prevented.

2. A method according to claim 1, comprising:
   adjusting a duration of the allowing cycles (D1) and the restricting cycles (D2) to achieve an average of the reductant flow to be the setpoint value.

3. A method according to claim 2, comprising:
   controlling, during the allowing cycles (D1), at least one valve according to PI or PID control logic.

4. A method according to claim 3, comprising:
   measuring, during the allowing cycles (D1), the reductant flow with the flow meter; and
   measuring an average flow for achieving the reductant flow according to the setpoint value as average.

5. A method according to claim 2, wherein said valve is a proportional valve, the method comprising:
   storing at a beginning of the restricting cycles (D2), a controlling value for the proportional valve to a memory, and after that:
   changing the controlling value for the proportional valve to a zero reductant flow, freezing the controlling value to the zero reductant flow until an end of the restricting cycles (D2); and
   restoring the controlling value from the memory at an end of the restricting cycles (D2).

6. A method according to claim 2, wherein the valves to be controlled are a proportional valve, and an on-off valve, the method comprising:
   holding, at a beginning of the restricting cycles (D2), a controlling value for the proportional valve until an end of the restricting cycles (D2), with the on-off valve closed; and
   opening, at an end of the restricting cycles (D2), the on-off valve.

7. A method according to claim 2, comprising:
   measuring emission of the internal combustion engine, and when a measured emission is above an allowed level:
   holding the setpoint value and adjusting the duration of the allowing cycles (D1) and the restricting cycles (D2) and/or changing the low mode setpoint value (LS) until the measured emission is at an allowed level or lower.

8. A method according to claim 1, wherein the predetermined threshold value (L1) corresponds with a minimum accuracy limit of the flow meter.

9. A method according to claim 4, wherein said valve is a proportional valve, the method comprising:
   storing at a beginning of the restricting cycles (D2), a controlling value for the proportional valve to a memory, and after that:
   changing the controlling value for the proportional valve to a zero reductant flow, and holding the controlling value to the zero reductant flow until an end of the restricting cycles (D2); and
   restoring the controlling value from the memory at an end of the restricting cycles (D2).

10. A method according to claim 4, wherein the valves to be controlled are a proportional valve, and an on-off valve, the method comprising:
    holding, at a beginning of the restricting cycles (D2), a controlling value for the proportional valve until an end of the restricting cycles (D2), with the on-off valve closed; and
    opening, at an end of the restricting cycles (D2) the on-off valve.

11. A method according to claim 4, comprising:
    measuring emission of the internal combustion engine, and when a measured emission is above an allowed level:
    holding the setpoint value and adjusting the duration of the allowing cycles (D1) and the restricting cycles (D2) and/or changing the low mode setpoint value (LS) until the measured emission is at an allowed level or lower.

12. A method according to claim 10, comprising:
    measuring emission of the internal combustion engine, and when a measured emission is above an allowed level:
    holding the setpoint value and adjusting the duration of the allowing cycles (D1) and the restricting cycles (D2) and/or changing the low mode setpoint value (LS) until the measured emission is at an allowed level or lower.

13. A method according to claim 1, wherein the predetermined threshold value (L1) corresponds with a minimum accuracy limit of the flow meter.

14. A method according to claim 12, wherein the predetermined threshold value (L1) corresponds with a minimum accuracy limit of the flow meter.

* * * * *